United States Patent
Tatsumi et al.

(10) Patent No.: US 9,634,582 B2
(45) Date of Patent: Apr. 25, 2017

(54) DETACHABLE GENERATOR DEVICE

(75) Inventors: Yoshiaki Tatsumi, Kawasaki (JP);
Megumu Kawae, Kawasaki (JP);
Hiroyuki Moriyama, Kawasaki (JP);
Toshifumi Sugawara, Kawasaki (JP)

(73) Assignee: CREATIVE TECHNOLOGY CORPORATION, Tokyo (JP)

( * ) Notice: Subject to any disclaimer, the term of this patent is extended or adjusted under 35 U.S.C. 154(b) by 64 days.

(21) Appl. No.: 14/004,635

(22) PCT Filed: Mar. 14, 2012

(86) PCT No.: PCT/JP2012/056553
§ 371 (c)(1),
(2), (4) Date: Sep. 11, 2013

(87) PCT Pub. No.: WO2012/128147
PCT Pub. Date: Sep. 27, 2012

(65) Prior Publication Data
US 2014/0009861 A1    Jan. 9, 2014

(30) Foreign Application Priority Data

Mar. 23, 2011   (JP) ................................. 2011-063628

(51) Int. Cl.
*H02N 13/00* (2006.01)
*H02S 20/20* (2014.01)
*H02S 10/40* (2014.01)

(52) U.S. Cl.
CPC ............. *H02N 13/00* (2013.01); *H02S 10/40* (2014.12); *H02S 20/20* (2014.12)

(58) Field of Classification Search
CPC .......... H02N 13/00; H02S 10/40; H02S 20/20
(Continued)

(56) References Cited

U.S. PATENT DOCUMENTS

2007/0177071 A1*  8/2007  Egi .................. G02F 1/133533
                                                        349/96

FOREIGN PATENT DOCUMENTS

JP        58-52884 A      3/1983
JP        60-55649 A      3/1985
(Continued)

OTHER PUBLICATIONS

European Search Report, dated Oct. 2, 2014, for European Application No. 12760717.4.
(Continued)

*Primary Examiner* — Ann Hoang
(74) *Attorney, Agent, or Firm* — Birch, Stewart, Kolasch & Birch, LLP

(57) ABSTRACT

Provided is a detachable generator device which can change the installation location with ease and which can effectively use a solar cell to generate electric power. The detachable generator device includes: a film-like solar cell; and attaching/detaching means for allowing the film-like solar cell to be attached to and detached from an attachment object at an installation location. The attaching/detaching means includes an adhesive film having an attaching/detaching surface which develops Van der Waals force to enable repeated affixation, or an electrostatic chuck for forming an attaching/detaching surface by turning on/off a voltage source connected to an attraction electrode sandwiched between two insulating layers to freely develop electrostatic attraction on a surface of at least one of the insulating layers.

3 Claims, 4 Drawing Sheets

(58) Field of Classification Search
USPC .......................................................... 361/234
See application file for complete search history.

(56) References Cited

FOREIGN PATENT DOCUMENTS

| | | |
|---|---|---|
| JP | 2-30718 U | 2/1990 |
| JP | 2-120125 A | 5/1990 |
| JP | 10-256576 A | 9/1998 |
| JP | 2000-54749 A | 2/2000 |
| JP | 2004-207644 A | 7/2004 |
| JP | 2008-42142 A | 2/2008 |
| JP | 2009-167665 A | 7/2009 |
| WO | WO 2010/032676 A1 | 3/2010 |

OTHER PUBLICATIONS

Translation of the International Preliminary Report on Patentability (PCT/IB/338 and PCT/IPEA/409), dated Oct. 10, 2013, for International Application No. PCT/JP2012/056553.
International Search Report issued in PCT/JP2012/056553, dated Jun. 5, 2012.

* cited by examiner

DETACHABLE GENERATOR DEVICE

TECHNICAL FIELD

The present invention relates to a generator device using a solar cell, and more particularly, to a generator device that is detachably attachable to an attachment object at an installation location.

BACKGROUND ART

In the context of improvement in conversion efficiency and reduction of costs, attention is focused on a solar cell. Among other things, in recent years, along with an increased interest in clean energy, a solar cell has been installed on an external wall or a window of a private house, a building, or the like, and the generated electric power has been used in facilities in the building or the like.

For example, Patent Literature 1 describes that a solar cell is installed on a window pane of a building with safety and with ease by affixing a film-like dye sensitized solar cell on an indoor side of the window pane of the building with a transparent adhesive, or by hanging the solar cell from an expansion and contraction bar supported by a window frame on the indoor side. However, once a solar cell is affixed to a windowpane with an adhesive, it is difficult to move and install the solar cell to and at some other location. Further, even when a solar cell is hung from an expansion and contraction bar, it is necessary to select a location at which the expansion and contraction bar is attachable, and thus, actually, the installation location is limited.

Patent Literature 2 describes a generator device using direct sunlight through a window of a building by affixing a film-like solar cell on a window side surface of a rolling screen body, to thereby install the solar cell using the curtain of the window. However, a window which is not provided with the rolling screen is required to be newly provided therewith, and thus, the solar cell cannot be installed with ease.

Further, Patent Literature 3 describes a sliding screen door in which light scattering adjustment and chromaticity change of a sliding screen face are possible and in which electric power used for control thereof is supplied from a solar cell. However, also in this case, the solar cell is fixed with respect to the sliding screen door, and thus, the installation location thereof cannot be moved with ease.

CITATION LIST

Patent Literature

[PTL 1] JP 2009-167665 A
[PTL 2] JP 2008-42142 A
[PTL 3] JP 2000-54749 A

SUMMARY OF INVENTION

Technical Problem

Accordingly, the inventors of the present invention diligently reviewed a generator device in which the installation location of a solar cell can be freely selected and which is freely attachable to and detachable from an attachment object to enable change in installation location with ease. As a result, the inventors of the present invention developed a generator device which is attachable to and detachable from an attachment object at an installation location to complete the present invention by using an adhesive film which develops the van der Waals force or an electrostatic chuck which develops electrostatic attraction and providing anyone of them as attaching/detaching means for a film-like solar cell.

Accordingly, an object of the present invention is to provide a detachable generator device which can change the installation location with ease and which can effectively use a solar cell to generate electric power.

Solution to Problem

Specifically, the present invention relates to a detachable generator device including a film-like solar cell and attaching/detaching means for allowing the film-like solar cell to be attached to and detached from an attachment object at an installation location. The attaching/detaching means is an adhesive film having an attaching/detaching surface which develops Van der Waals force to enable repeated affixation, or an electrostatic chuck for forming an attaching/detaching surface by turning on/off a voltage source connected to an attraction electrode sandwiched between two insulating layers to freely develop electrostatic attraction on a surface of at least one of the insulating layers.

According to the present invention, as a choice of the attaching/detaching means provided for the solar cell, the adhesive film having an attaching/detaching surface which develops the Van der Waals force (intermolecular force) to enable repeated affixation is used. In the adhesive film, minute protrusions having a fiber structure with a high aspect ratio on the order of submicrons are formed on the surface thereof, which are thought to develop adhesive force due to very weak intermolecular force. As a material for forming such adhesive film, there may be given, for example, a silicone resin, polyamide, styrene butadiene rubber, chlorosulfonated polyethylene rubber, acrylonitrile butadiene rubber, ethylene propylene rubber, chloroprene rubber, butadiene rubber, fluoro rubber, isobutylene isoprene rubber, and urethane rubber.

According to the present invention, alternatively, as another choice of the attaching/detaching means provided for the solar cell, the electrostatic chuck for forming an attaching/detaching surface by turning on/off the voltage source connected to the attraction electrode sandwiched between the two insulating layers to freely develop electrostatic attraction on a surface of at least one of the insulating layers is used. The attraction electrode may be of a bipolar type which has a positive electrode and a negative electrode, or may be of a unipolar type which has only a positive (negative) electrode as the attraction electrode and in which a negative (positive) pole side is grounded. However, from the viewpoint of being arbitrarily attachable to the attachment object at the installation location irrespective of the material of the attachment object and being advantageous in developing more intense electrostatic attraction, it is preferred to adopt the bipolar type in which, for example, positive electrodes and negative electrodes are alternately arranged to develop gradient force. Further, in the electrostatic chuck, a voltage source switch for turning on/off the supply/block of electric power to the attraction electrode may be provided so that connection/disconnection of the voltage source to/from the attraction electrode can be made with ease.

The insulating layers which form the electrostatic chuck are generally formed of a synthetic resin or ceramic. Depending on the installation location of the generator device, a synthetic resin may be used, ceramic may be used, or, a synthetic resin may be used for one of the insulating layers and ceramic may be used for the other of the insulating layers with the attraction electrode being sandwiched therebetween. For example, when the generator device is used only indoors where the atmospheric environment is relatively stable including cases in which the generator device is attached to a window or a wall inside a building and cases in which the generator device is attached to a window or a sunroof of a car, it is preferred to use a synthetic resin. When the generator device is used only outdoors and weather-damaged including cases in which the generator device is attached to a wall or a window outside a building and cases in which the generator device is attached to a roof or the exterior of a car, a train, or the like, it is preferred to use ceramic. Further, depending on the usage environment, one of the insulating layers may be formed of a synthetic resin and the other may be formed of ceramic. Alternatively, irrespective of the installation location, when the attachment object is curved or bent, it is suitable to form the insulating layers of a flexible resin sheet of polyimide, polyethylene terephthalate (PET), polyethylene naphthalate (PEN), or the like.

When such an electrostatic chuck is the attaching/detaching means, the thickness thereof is appropriately selected depending on the installation location of the generator device and the like, but, from the viewpoint of handling and durability, it is preferred that the thickness of the electrostatic chuck including the attraction electrode be 0.02 mm or more and 0.2 mm or less, and it is more preferred that the electrostatic chuck be formed in the shape of a sheet or a thin plate having a thickness of 0.05 mm or more and 0.1 mm or less.

Further, when the electrostatic chuck is the attaching/detaching means, the generator device may include a booster circuit so that part of the electric power generated by the solar cell is boosted and supplied to the attraction electrode of the electrostatic chuck to develop the electrostatic attraction. In that case, in order that the generator device can be maintained to be installed even during a period in which the power generating function of the solar cell is deteriorated such as during the night or during rain, it is preferred to provide electric power storing means such as a battery or a large capacity capacitor for storing the electric power generated by the solar cell.

The film-like solar cell used in the present invention is not specifically limited insofar as it can convert light energy into electrical energy to generate electric power, and a publicly known one can be used. Among others, from the viewpoint of being convenient to form so as to be film-like, being able to be used in a bent state, and the like, in addition to a dye sensitized solar cell and an amorphous silicon thin film solar cell, a CIGS thin film solar cell having a power generating layer containing a compound semiconductor whose raw materials are copper (Cu), indium (In), gallium (Ga), and selenium (Se) are suitable.

Further, for example, when the generator device is attached to a window, a wall, or the like outside a building, or the generator device is attached to a roof, the exterior, or the like of a car or the like to use sunlight outdoors, or when the generator device is attached to a wall inside a building to use light of a fluorescent lamp or the like indoors, the attaching/detaching means is provided using an adhesive, double-sided tape, or the like on a side opposite to a light receiving surface of the film-like solar cell. By attaching the attaching/detaching means with the attaching/detaching surface facing toward the attachment object such as the external wall of the building, the solar cell can receive light on a rear surface side of the attaching/detaching means (on a side opposite to the attachment object) to generate electric power. In that case, when, for some reason such as change in the direction of the sunlight, the installation location of the generator device is required to be changed, by peeling off the adhesive film by hand or blocking electric power supplied to the attraction electrode of the electrostatic chuck, the generator device is detached from the attachment object once, and then the generator device is attached again to some other installation location. In this way, the installation location of the generator device can be changed with ease.

On the other hand, when, for example, the generator device is attached to a window, a sunroof, or the like of a building, a car, a train, or the like to use light which passes through the window or the like and generate electric power indoors, the attaching/detaching means is provided along an outer peripheral portion of the film-like solar cell on the light receiving surface side. By attaching the attaching/detaching surface to a transparent attachment object such as the window from the indoor side, the solar cell can receive light from the attaching/detaching means side (attachment object side) to generate electric power.

Further, the attaching/detaching means may be provided so as to surround an outer periphery of the film-like solar cell so that the attaching/detaching surface is flush with the solar cell, a support sheet may be affixed to a rear surface side thereof so that the solar cell and the attaching/detaching means are integral with each other, the attaching/detaching surface may be attached to a transparent attachment object such as a window, and the solar cell may generate electric power using light received from the attachment object side.

Further, by using a transparent material for the adhesive film which forms the attaching/detaching means, or forming the insulating layers of a transparent resin such as a polyimide and forming the attraction electrode as a transparent conductive film or the like of ITO, zinc oxide, or the like to form the electrostatic chuck of transparent materials and bonding it to the light receiving surface side of the film-type solar cell, the attaching/detaching surface thereof may be attached to a transparent attachment object such as a window from the indoor side to cause the solar cell to generate electric power using light received from the attachment object side.

Also when, as described above, electric power is generated using light received from the attachment object side, for example, the window on which the generator device is installed can be changed with ease depending on the time slot in the daytime, or, the generator device is temporarily attachable to a window when required to be used to generate electric power with ease.

The electric power generated by the generator device may be used for facilities in the building, facilities in the car, or the like using, for example, a connection terminal which can be connected to an external load and which is provided in the solar cell, or, may be stored in a storage cell or the like to be used at some other location.

Advantageous Effects of Invention

In the generator device according to the present invention, by providing the solar cell with the adhesive film which develops the Van der Waals force to enable repeated affixation or the electrostatic chuck which can freely develop the electrostatic attraction as the attaching/detaching means, repeated attachment to the attachment object can be carried out, and the installation location can be changed and mounted with ease. Further, the solar cell can generate electric power effectively and efficiently. For example, electric power can be generated when necessary by a necessary amount.

DESCRIPTION OF EMBODIMENTS

A generator device according to preferred embodiments of the present invention is described in the following with reference to the attached drawings. Note that, the present invention is not limited to the following description.

EMBODIMENTS

First Embodiment

Figure 1:
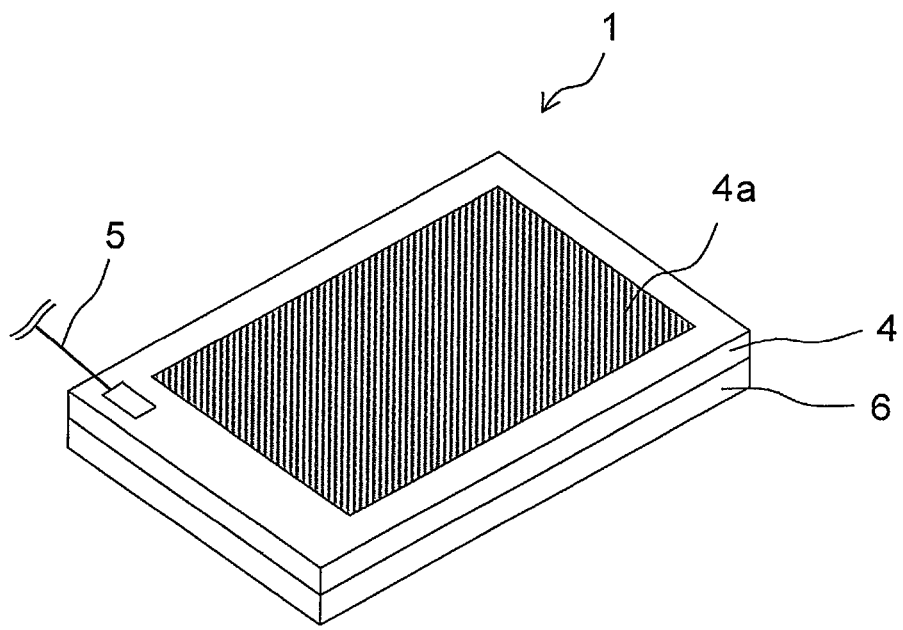
FIG. 1 is an explanatory perspective view for illustrating a generator device of a first embodiment according to the present invention.
Figure 2:
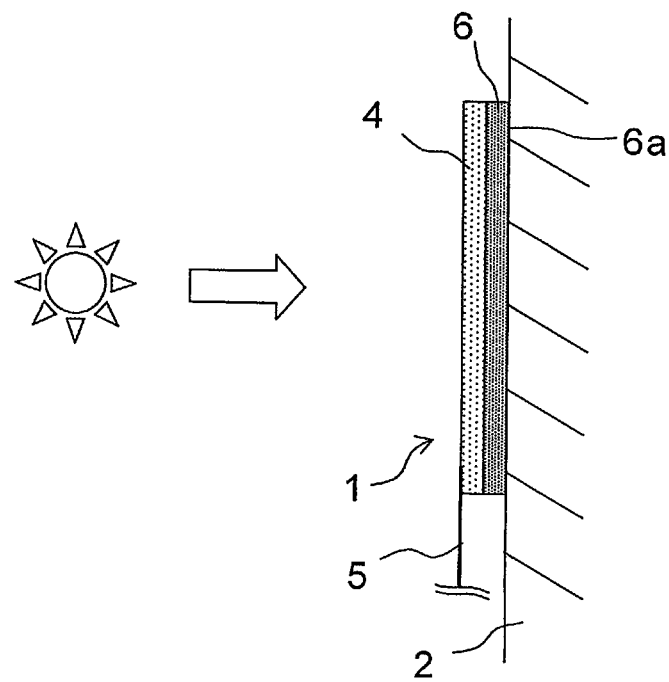
FIG. 2 is an explanatory sectional view for illustrating a state in which the generator device of the first embodiment is attached to an external wall and generates electric power.

FIG. 1 and FIG. 2 illustrate a generator device 1 according to a first embodiment of the present invention.

As illustrated in FIG. 1, the generator device 1 of the first embodiment uses a solar cell 4 a film-type amorphous silicon thin film solar cell (Sunslick-7W manufactured by VHF/Switzerland) which has a size of 350 mm×695 mm×1.2 mm in thickness and which weighs 480 g. A connection terminal 5 which can be connected to an external load is attached to the solar cell 4. Further, as attaching/detaching means, an adhesive film 6 formed of a silicone resin having a thickness of 100 μm (manufactured by Fuso Rubber Co., Ltd. under the trade name Sirius) is used. The adhesive film 6 is cut out so as to be sized substantially similarly to the solar cell 4, and a rear surface of the adhesive film 6 is bonded by an adhesive onto a surface of the solar cell opposite to a light receiving surface 4a thereof so as to be integral. The adhesive film 6 has an attaching/detaching surface 6a which has minute protrusions formed thereon to develop pressure-sensitive adhesive force due to very weak intermolecular force to enable repeated affixation.

When the generator device 1 according to the first embodiment is used, as illustrated in FIG. 2, for example, by attaching the attaching/detaching surface 6a of the adhesive film 6 to an external wall 2 of a building, the light receiving surface 4a of the solar cell 4 can receive sunlight to generate electric power. The generated electric power can be used for a load such as an outdoor lighting fixture connected via the connection terminal 5. Further, the generator device 1 is detachable from the external wall 2 with ease by peeling off the attaching/detaching surface 6a of the adhesive film 6 by hand, and thus, the generator device can be moved from the installation location with ease and simplicity so as to be, for example, housed during the night or during rain and attached again next morning or when the weather is fine to generate electric power.

Second Embodiment

Figure 3:
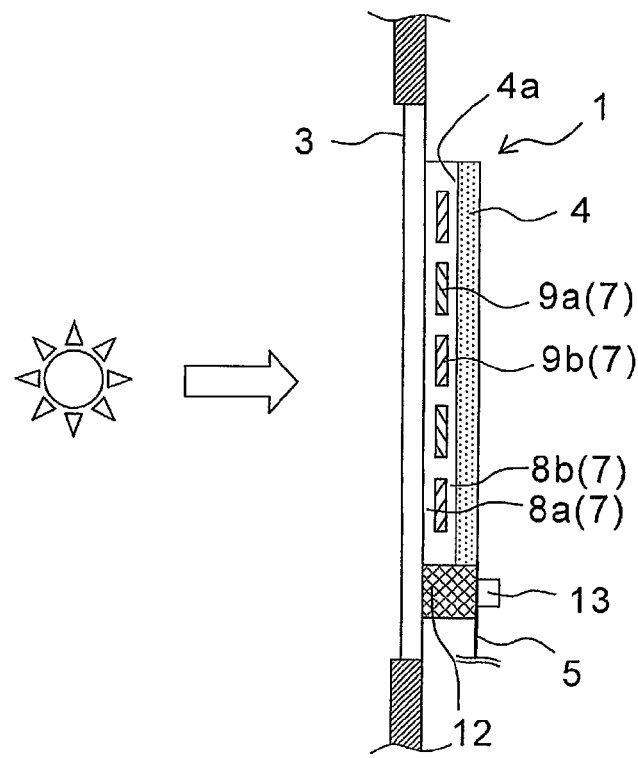
FIG. 3 is an explanatory sectional view for illustrating a state in which a generator device of a second embodiment according to the present invention is attached to a window from the inside of a building and generates electric power.
Figure 4:
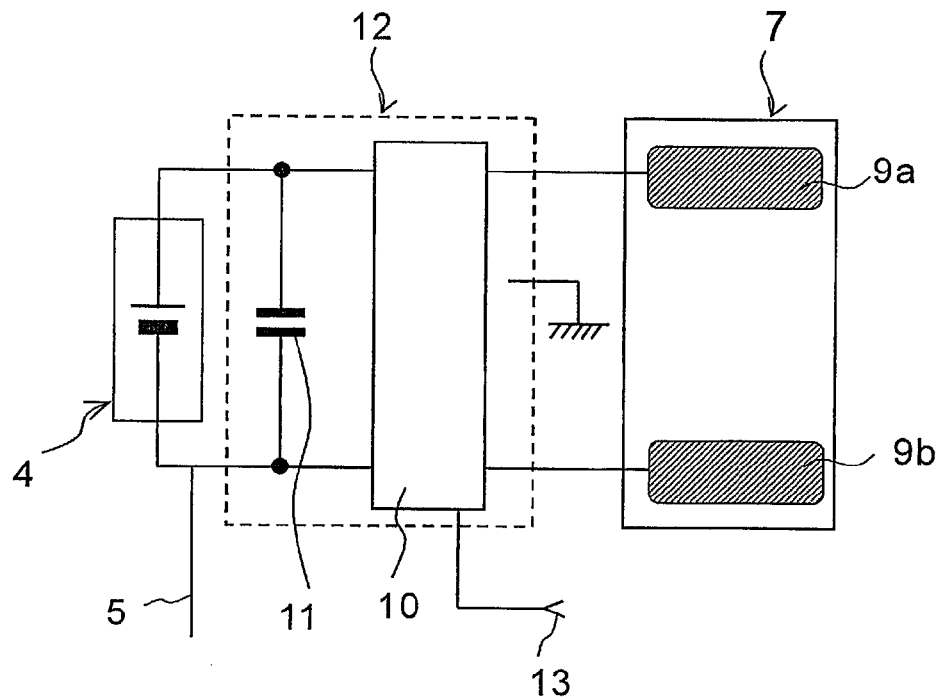
FIG. 4 is a schematic explanatory diagram for illustrating the generator device of the second embodiment.

FIG. 3 and FIG. 4 illustrate a generator device 1 according to a second embodiment of the present invention.

In the second embodiment, as illustrated in FIG. 3, an electrostatic chuck 7 is used as the attaching/detaching means. The electrostatic chuck 7 is formed of transparent materials as described below and is bonded onto the light receiving surface 4a of the same film-type solar cell 4 as that used in the first embodiment by using transfer tape (double-sided pressure-sensitive adhesive) manufactured by VIGteQnos Corporation to form the generator device 1. Specifically, two transparent PET films each of which is sized substantially similarly to the solar cell 4 and has a thickness of 0.5 mm are prepared. One of the films is used as a first insulating layer 8a and an ITO film having a thickness of about 0.3 μm is vapor deposited on one surface thereof via a predetermined mask to provide a transparent attraction electrode 9 in which positive electrode portions 9a each having a width of 0.7 mm and negative electrode portions 9b each having a width of 0.7 mm are alternately arranged like the teeth of a comb at an interval of 0.7 mm. The other polyimide film as a second insulating layer 8b is bonded so as to cover the attraction electrode 9 on the PET film by using transfer tape (double-sided pressure-sensitive adhesive) manufactured by VIGteQnos Corporation to obtain the electrostatic chuck 7.

Further, the generator device 1 according to the second embodiment includes an electric power controller 12 which connects the solar cell 4 and the electrostatic chuck 7. As illustrated in FIG. 4, the electric power controller 12 includes a booster circuit 10 for boosting the electric power generated by the solar cell 4, and boosts part of the electric power at about 10 V generated by the solar cell to electric power at about 1,000 V which is necessary for the electrostatic chuck 7 to develop the electrostatic attraction. Further, the electric power controller 12 includes a large capacity capacitor 11 having an energy capacity of about 200 mWh between the solar cell 4 and the booster circuit 10 so as to store the electric power generated by the solar cell 4 and so as to, even when the power generating ability of the solar cell 4 is temporarily stopped or reduced, be able to supply electric power to the electrostatic chuck 7. Further, the electric power controller 12 is provided with a voltage source switch 13. The voltage source switch 13 is connected to the booster circuit 10. By using the voltage source switch 13 to turn on/off the supply of electric power to the electrostatic chuck 7, the electrostatic attraction on the surface of the first insulating layer 8a of the electrostatic chuck 7 as the attaching/detaching surface can be developed or can be blocked.

When the generator device 1 according to the second embodiment is used, as illustrated in FIG. 3, for example, by attaching the first insulating layer 8a of the electrostatic chuck 7 as the attaching/detaching surface to a windowpane 3 through which sunlight passes from the indoor side of a building, the light receiving surface 4a of the solar cell 4 can receive sunlight through the electrostatic chuck 7 formed of transparent materials to generate electric power. The generated electric power can be used for various kinds of equipment connected via the connection terminal 5. Further, the generator device 1 can release with ease the electrostatic attraction developed on the attaching/detaching surface of the electrostatic chuck 7 by turning off the voltage source switch 13, and thus, the window to which the generator device is attached can be changed with ease in accordance with the direction of the sunlight. When electric power is generated indoors using the electrostatic chuck as the attaching/detaching means in this way, the possibility that the electrostatic attraction is reduced with time is low, and thus, the generator device can be used for a long time with reliability.

Third Embodiment

Figure 5:
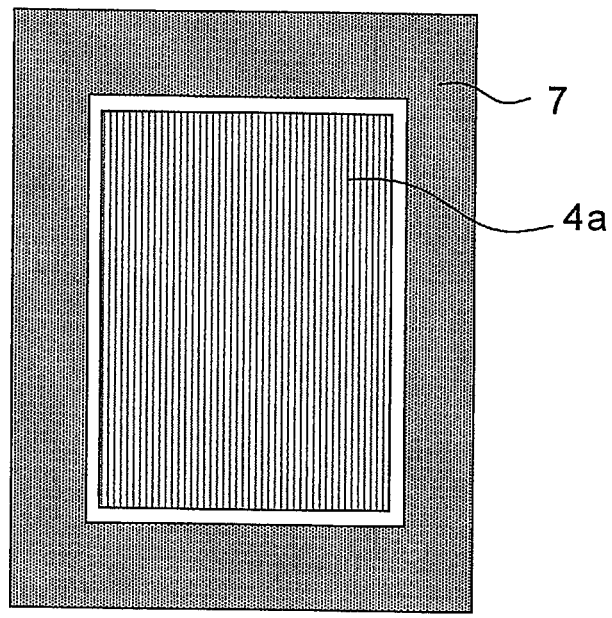
FIG. 5 is an explanatory plan view for illustrating a generator device of a third embodiment according to the present invention.
Figure 6:
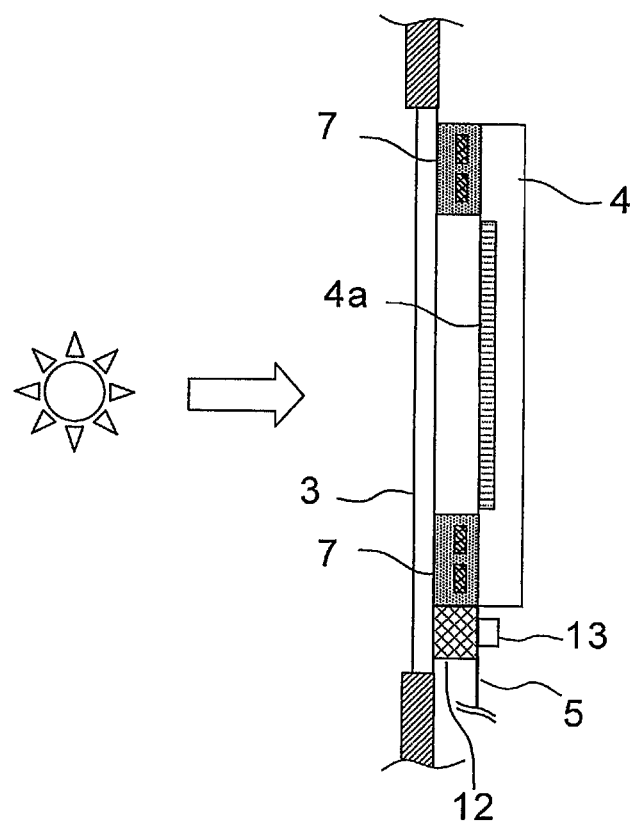
FIG. 6 is an explanatory sectional view for illustrating a state in which the generator device of the third embodiment is attached to a window from the inside of a building and generates electric power.

FIG. 5 and FIG. 6 illustrate a generator device 1 according to a third embodiment of the present invention.

The generator device 1 of the third embodiment uses the same film-type solar cell 4 as that used in the first embodiment, and the electrostatic chuck 7 is affixed along an outer peripheral portion on the light receiving surface 4a side (that is, an outer frame portion outside a region having the amorphous silicon thin film) by using transfer tape (double-sided pressure-sensitive adhesive) manufactured by VIGte-Qnos Corporation. Further, the electric power controller and the like are similar to those in the second embodiment.

The electrostatic chuck 7 is formed to be frame-like so as not to block light to be received by the light receiving surface of the solar cell, and is formed as in the following. First, two Kapton (trademark) films manufactured by DU PONT-TORAY CO., LTD. each having a thickness of 50 m are prepared. One of the films is used as a first insulating layer 8a and a carbon electrode is formed to have a thickness of 18 μm by printing on one surface thereof via a predetermined mask to provide an attraction electrode 9 in which positive electrode portions 9a each having a width of 0.7 mm and negative electrode portions 9b each having a width of 0.7 mm are alternately arranged like the teeth of a comb at an interval of 0.7 mm. The other Kapton (trademark) film as a second insulating layer 8b is bonded so as to cover the attraction electrode 9 on the film by using transfer tape (double-sided pressure-sensitive adhesive) manufactured by VIGteQnos Corporation to obtain the electrostatic chuck 7 which is formed of the frame by punching.

The generator device 1 according to the third embodiment can be, similarly to the case of the second embodiment, used through attachment to a window pane from the indoor side or the like and can be used for a long time with reliability, and in addition, the light receiving surface of the solar cell 4 is covered with nothing, and thus, compared with the case of the second embodiment, the power generating efficiency is more excellent.

Fourth Embodiment

Figure 7:
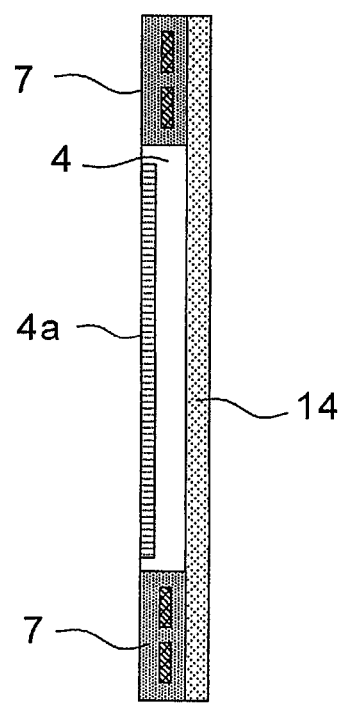
FIG. 7 is an explanatory sectional view for illustrating a generator device of a fourth embodiment according to the present invention.

FIG. 7 illustrates a generator device 1 according to a fourth embodiment of the present invention.

The generator device 1 of the fourth embodiment uses the same film-like solar cell as that used in the first embodiment, and an electrostatic chuck 7 is provided so as to surround an outer periphery thereof. The attaching/detaching surface which is a first insulating layer 7a of the electrostatic chuck 7 is flush with the light receiving surface of the solar cell 4. A support sheet which is a two-side coated Kapton (trademark) sheet having a thickness of about 0.1 mm is affixed to a rear surface side thereof so that the solar cell 4 and the electrostatic chuck 7 are integral with each other. In this case, the electrostatic chuck 7 can be formed similarly to the electrostatic chuck in the third embodiment, and the electric power controller and the like are similar to those in the second embodiment.

The generator device 1 according to the fourth embodiment can be, similarly to the case of the third embodiment, used for a long time with reliability, and in addition, the light receiving surface of the solar cell 4 is directly attachable to an attachment object such as a window, and thus, the power generating efficiency is more excellent.

REFERENCE SIGNS LIST

1 . . . generator device
2 . . . external wall (attachment object)
3 . . . window (attachment object)
4 . . . solar cell
4a . . . light receiving surface
5 . . . connection terminal
6 . . . adhesive film (attaching/detaching means)
7 . . . electrostatic chuck
8 . . . insulating layer
8a . . . first insulating layer
8b . . . second insulating layer
9 . . . attraction electrode
9a . . . positive electrode portion
9b . . . negative electrode portion
10 . . . booster circuit
11 . . . large capacity capacitor
12 . . . electric power controller
13 . . . voltage source switch
14 . . . support sheet

The invention claimed is:

1. A detachable generator device, comprising:
a thin film solar cell; and
an electrostatic chuck for allowing repeatably the thin film solar cell to be attached to and detached from a surface of a transparent attachment object by electrostatic attraction, wherein
the electrostatic chuck comprises an attraction electrode and insulating layers, the attraction electrode sandwiched between the insulating layers, so that the electrostatic attraction is generated on at least one surface of the insulating layers of the electrostatic chuck by turning on a voltage source connected to the attraction electrode,
the insulating layers and the attraction electrode are each formed of a transparent material,
the insulating layers comprise at least one flexible resin sheet selected from the group consisting of polyimide, polyethylene terephthalate, and polyethylene naphthalate, and
the thin film solar cell is disposed on another surface of the insulating layers of the electrostatic chuck, so that said at least one surface of the insulating layers, on which electrostatic attraction is generated, is attached to the transparent attachment object, and the solar cell receives light through the transparent attachment object and the electrostatic chuck and generates electric power using the light.

2. A detachable generator device according to claim 1, wherein the generator device further comprises a booster circuit and part of electric power generated by the solar cell is boosted and supplied to the attraction electrode of the electrostatic chuck to develop the electrostatic attraction.

3. A detachable generator device according to claim 1, wherein the transparent attachment object is a window.

\* \* \* \* \*